(12) United States Patent
Womer et al.

(10) Patent No.: US 7,156,550 B2
(45) Date of Patent: Jan. 2, 2007

(54) APPARATUS FOR PLASTICATING THERMOPLASTIC RESIN INCLUDING POLYPROPYLENE

(75) Inventors: Timothy W. Womer, Edinburg, PA (US); Walter S. Smith, New Castle, PA (US)

(73) Assignee: Xaloy, Inc., New Castle, PA (US)

( * ) Notice: Subject to any disclaimer, the term of this patent is extended or adjusted under 35 U.S.C. 154(b) by 300 days.

(21) Appl. No.: 10/897,368

(22) Filed: Jul. 22, 2004

(65) Prior Publication Data

US 2006/0018186 A1 Jan. 26, 2006

(51) Int. Cl.
B29B 7/42 (2006.01)

(52) U.S. Cl. .......................... 366/88; 366/89

(58) Field of Classification Search ............ 366/79–85, 366/88–90, 318–324; 425/204, 208, 209
See application file for complete search history.

(56) References Cited

U.S. PATENT DOCUMENTS

| | | | |
|---|---|---|---|
| 2,753,595 A | 7/1956 | Dulmage | |
| 3,006,029 A | 10/1961 | Saxton | |
| 3,445,890 A * | 5/1969 | Heston et al. | 425/209 |
| 3,486,192 A | 12/1969 | Le Roy | |
| 3,524,222 A | 8/1970 | Gregory et al. | |
| 3,652,064 A | 3/1972 | Lehnen et al. | |
| 3,698,541 A | 10/1972 | Barr | |
| 3,941,535 A | 3/1976 | Street | |
| 4,000,884 A | 1/1977 | Chung | |
| 4,079,463 A * | 3/1978 | Miller | 366/89 |
| 4,085,461 A | 4/1978 | Maillefer | |
| 4,128,341 A | 12/1978 | Hsu | |
| 4,201,481 A | 5/1980 | Iddon et al. | |
| 4,215,978 A | 8/1980 | Takayama et al. | |
| 4,227,870 A | 10/1980 | Kim | |
| 4,277,182 A | 7/1981 | Kruder | |
| 4,341,474 A | 7/1982 | Wheeler, Jr. et al. | |
| 4,363,768 A * | 12/1982 | Kruder | 264/68 |
| 4,405,239 A | 9/1983 | Chung et al. | |
| 4,639,143 A | 1/1987 | Frankland, Jr. | |
| 4,752,136 A * | 6/1988 | Colby | 366/89 |
| 4,786,181 A | 11/1988 | O'Brien | |
| 4,798,472 A | 1/1989 | Chan et al. | |

(Continued)

FOREIGN PATENT DOCUMENTS

EP 0 046 931 3/1982

(Continued)

OTHER PUBLICATIONS

Eric E. Strangland et al., "Fundamental Characterization of Polypropylene Extrusion", *Society of Plastic Engineers ANTEC*, 2002, p. 448, vol. 1, United States.

(Continued)

*Primary Examiner*—Charles E. Cooley
(74) *Attorney, Agent, or Firm*—Robert J. Herberger, Esq.

(57) ABSTRACT

Apparatus according to this invention for plasticating a resin polymer, especially polypropylene, includes a barrel having an inlet, outlet, and inner surface. A screw, located within and closely spaced from the inner surface of the barrel, has a longitudinal axis extending from the inlet toward the outlet, and includes length sections arranged in a series along the axis. The screw includes a core and a main flight located on and projecting radially from the core, extending in a helix along the axis, and having a push side and a trailing side. The screw sections include a feed section, a transition section following the feed section, a metering section following the transition section, and a barrier melting section following the metering section.

16 Claims, 4 Drawing Sheets

U.S. PATENT DOCUMENTS

| | | | |
|---|---|---|---|
| 5,141,326 A | | 8/1992 | Eshima |
| 5,215,764 A | | 6/1993 | Davis et al. |
| 5,375,992 A | * | 12/1994 | Kruder et al. ............... 366/89 |
| 5,599,097 A | | 2/1997 | Christie |
| 5,798,077 A | * | 8/1998 | Womer et al. ............. 264/349 |
| 5,816,698 A | * | 10/1998 | Durina et al. ................ 366/81 |
| 6,056,430 A | | 5/2000 | Medici, Jr. et al. |
| 6,139,179 A | | 10/2000 | Christiano et al. |
| 6,488,399 B1 | | 12/2002 | Womer et al. |
| 6,497,508 B1 | | 12/2002 | Womer et al. |
| 6,547,431 B1 | | 4/2003 | Womer |
| 6,599,004 B1 | * | 7/2003 | Barr ............................ 366/88 |
| 6,672,753 B1 | | 1/2004 | Womer et al. |
| 7,014,353 B1 | * | 3/2006 | Womer et al. ............... 366/88 |
| 2006/0018186 A1 | * | 1/2006 | Womer et al. ............... 366/88 |

FOREIGN PATENT DOCUMENTS

| | | | |
|---|---|---|---|
| GB | 2137893 | | 10/1984 |
| JP | 59-202835 | | 11/1984 |
| JP | 60-21228 | * | 2/1985 |
| JP | 63-291632 | | 11/1988 |

OTHER PUBLICATIONS

C.Y. Cheng, "Effects of Polypropylene Crystallinity on Extrusion", *Society of Plastic Engineers ANTEC*, 1995, p. 98-106, United States C.Y. Cheng, "Extrusion Characteristics of Polypropylene Resins", *Society of Plastic Engineers ANTEC*, 1988, p. 34-37, United States.

* cited by examiner

PRIOR ART

*Figure 2*

New Art

APPARATUS FOR PLASTICATING THERMOPLASTIC RESIN INCLUDING POLYPROPYLENE

BACKGROUND OF THE INVENTION

This invention relates to plasticating resin using a screw rotating in an extrusion or injection molding barrel, from which the resin extrudes or flows to form a product in a die or mold. More particularly, the invention pertains to the arrangement and structural form of various sections of a screw that is especially suited for use in plasticating polypropylene resin.

Polypropylene has been commercially available since 1957 and has remained the fastest growing major thermoplastic, its growth rate being greater than that of many other commodity polymers. The resin is readily available at relatively low cost, and it possesses many unique properties that are suitable for a wide variety of consumer and industrial products. Its excellent crack resistance, low creep rate, low density and high melting point have contributed to its broad applications in injection molding, film, fiber and filaments.

Its fabrication, however, requires an extrusion step in which resin pellets are converted to a molten state to form a desired product. It is well known that polypropylene is more difficult to extrude than polyethylene. Generally, polypropylene output from an extruder of a given size is lower than the output of polyethylene because polypropylene resins plasticate in single-screw extruders slower than do polyethylene resins. When processing polypropylene resin on a conventional screw specifically designed for processing polyethylene, the output rate reduction for polypropylene is about 30 percent compared to polyethylene.

The process variables and equipment for extruding polypropylene have received much attention due to its low output rate, low-melt strength, and sensitivity to shear. The chemical and physical properties that contribute to the extrusion difficulties of polypropylene are its high crystallinity and stiffness. High crystallinity requires greater heat input at the melting section of an extruder in order to supplement the energy required for melting. Its low melt viscosity reduces the effectiveness of viscous shear heating in the melting section; therefore, its rate of melting is lower than that of polymers having a higher melt viscosity. High stiffness or rigidity makes it more difficult for polypropylene resin pellets to be compressed and transported in the feed and compression sections of a plasticating screw.

In order to improve the extrusion throughput rate of polypropylene, attempts have been made to improve the onset of melting and the rate of melting by increasing the magnitude and rate of external heat input through the barrel wall to the resin. To improve the throughput rate of polypropylene, some extruder designers choose a barrel diameter that is one size larger than would be required to produce the same output rate with low-density polyethylene resin. Data produced with plasticating apparatus including a screw having a feed section, a transition section and a metering section, but no barrier section, were reported by E. E. Strangland et al. and by C. Y. Cheng in separate technical papers that contain data from plasticating polypropylene.

But a smaller diameter extruder has a larger heated surface area relative to its output rate. Therefore, a small extruder would permit greater heat input at the melting zone to supplement energy required for melting than would a larger extruder. Data for polypropylene processed with a small diameter extruder was reported by C. Y. Cheng in a technical paper published in 1988.

At best these conflicting design choices merely compensate for the physical and chemical properties of polypropylene that diminish its output rate, and they potentially impose higher equipment costs and increase energy costs. Despite these compromises, there remains a need to improve the extrusion output rate of polypropylene using a process and apparatus that do not unnecessarily increase production costs.

SUMMARY OF THE INVENTION

Polypropylene has a relatively low viscosity and low coefficient of friction in the molten state. It has been discovered that a principal reason for the relatively low extrusion rate of polypropylene using conventional plasticating apparatus, such as the apparatus used to extrude polyethylene and other resins, is the tendency for polypropylene to adhere on the root of the plasticating screw in the screw sections ahead of a barrier section. A solid plug of resin located on the surface of the core is formed before the resin fully melts. This limits the rate at which the resin is conveyed forward in the plasticating barrel toward the outlet port, and the rate at which the resin is heated by the external heating sources. Generally, the external surface of the barrel wall is exposed to radiant or convective heat sources, which transmit heat through the barrel wall to resin within the barrel.

Conventional plasticating apparatus includes a relatively long feed section on the plasticating screw followed immediately by a barrier section, in which the resin melt is separated from the solid resin. This arrangement of screw sections further enhances the tendency to form a plug of unmelted polypropylene at the core surface, and to isolate the solids bed from the melt. Therefore, it is preferred to locate a barrier section of the plasticating screw behind a relatively short feed section, transition section and metering section, wherein the solid and melt portions of the resin charge are mixed and worked earlier and more thoroughly before entering the barrier section. These features limit formation of a plug of polypropylene resin that would otherwise adhere to the surface of the screw core.

It has been demonstrated that pressure within the barrel and along its length rises sooner and remains at a higher magnitude when plasticating polypropylene with the apparatus of this invention as compared to the resulting pressure profile produced when plasticating polypropylene with conventional apparatus. These data confirm the improved heating rate and flow rate of polypropylene through plasticating apparatus according to this invention.

Apparatus according to this invention for plasticating a resin polymer, especially polypropylene, includes a barrel having an inlet, outlet, and inner surface. A rotatable screw, located within and closely spaced from the inner surface of the barrel, has a longitudinal axis extending from the inlet toward the outlet, and includes sections of its length arranged in a series along the axis. The screw includes a core and a main flight located on and projecting radially from the core, the main flight extending in a helix along the axis and having a push side and a trailing side. The screw sections include a feed section, a transition section following the feed section, a metering section following the transition section, and a barrier melting section following the metering section.

Preferably the feed section has a root depth that is substantially constant, the transition section has a root depth that decreases along the transition section length, and the metering section has a root depth that is substantially constant but shallower than that of the feed section.

BRIEF DESCRIPTION OF THE DRAWINGS

The drawings are for the purpose of illustration only and not as a definition of the limits of the instant invention, for which reference should be made to the claims appended hereto. Other features, objects and advantages of this invention will become clear from the following more detailed description made with reference to the drawings in which:

DETAILED DESCRIPTION OF THE PREFERRED EMBODIMENT

Figure 1:
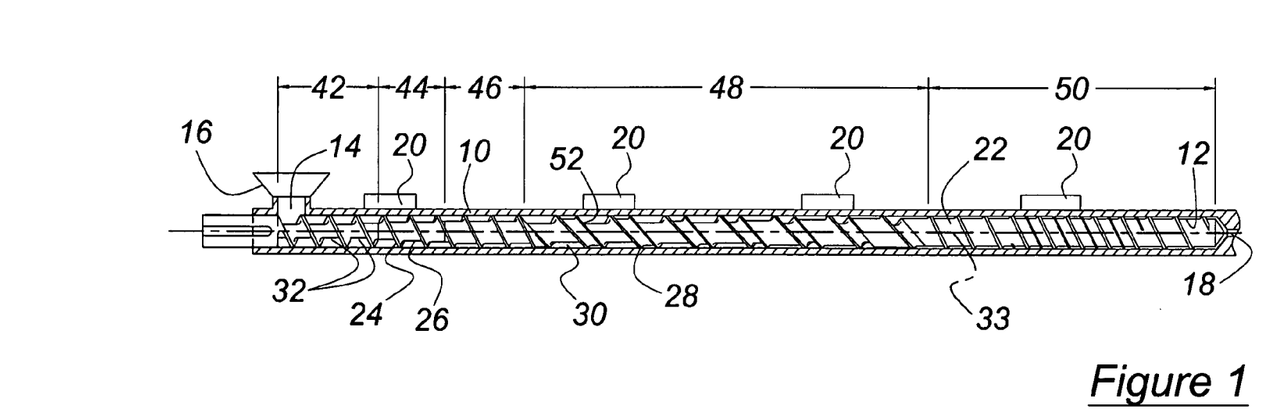
FIG. 1 is a side elevation of a plasticating apparatus with the barrel in cross section to expose a screw according to the present invention.

Referring first to FIG. 1, the plasticating apparatus for processing granules or pellets of resin includes a cylindrical barrel 10 having an inner surface 12. The barrel 10 is provided with an inlet port 14 for the admission, via a feed hopper 16, of one or more solid particulate resinous materials and any required additives or agents. The barrel 10 is also provided with a discharge or outlet port 18 for the discharge of plasticated molten extrudate to a mold or die (not shown) or other exit configuration. Elements 20 for heating and cooling the barrel can be provided at the outer surface of the barrel 10. There may also be a vent in the barrel wall through which undesirable volatilized matter in the resin leaves the barrel, and another inlet through which material, such as a dye is added to the contents of the barrel.

Located in the barrel 10 is a screw 22, supported for rotation and extending axially from the inlet port 14 to the outlet port 18. The screw 22 includes a main helical flight 24, typically a right-hand thread, extending radially from, and winding in multiple passes around a core 26. The main helical flight 24 includes a flight land 28, which moves in close cooperative association with the inner surface 12 of the barrel 10 with a radial clearance of about 0.005 to 0.007 inches on average. The main helical flight 24 defines a helical valley 30 forming a main helical channel 32 bounded by flight 24, inner wall 12 of the barrel 10 and the surface of the core 26 and extending along the longitudinal axis 33.

The depth of the helical valley 30, measured radially from the core surface 26 to the outer periphery of the main flight 24, is referred to as the root depth. As the screw 22 rotates, the main flight 24 forces the resinous materials to flow in the helical channel 32 axially forward toward outlet port 18.

Figure 2:
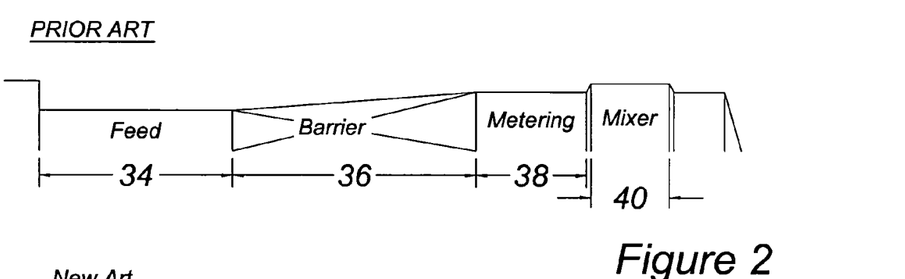
FIG. 2 is a schematic sketch showing the arrangement of sections of a plasticating screw in the prior art that is used for plasticating resins.

A conventional plasticating screw includes various sections arranged in series along the screw's length, each section performing a particular portion of the plasticating process. FIG. 2 illustrates a screw of the type known from the prior art that has been used to plasticate polypropylene. The screw includes a deep-root feed section 34 having a length of about 4.5 screw diameters, where solid resin enters the barrel where it is heated and conveyed forward. The feed section 34 is followed by a relatively long barrier section 36, in which solid resin is separated gradually from melted resin, the root depth of the solids channel grows shallower with increasing distance along the screw axis, and air spaces between the solid resin particles are eliminated. The length of the barrier section is about 13 screw diameters. The barrier section 36 is followed by a metering section 38 having a relatively shallow, constant depth root where the majority of the resin is in a molten state. The length of the metering section is about four screw diameters. Following the metering section 38 is a mixing section 40 about 2.5 screw diameters long, where the molten resin, additives and color additives are mixed into a homogeneous blend. The inlet port 14 is typically located at the beginning of the upstream feed section 34, and the outlet port 18 is located at the end of the downstream metering section 40.

Figure 3:
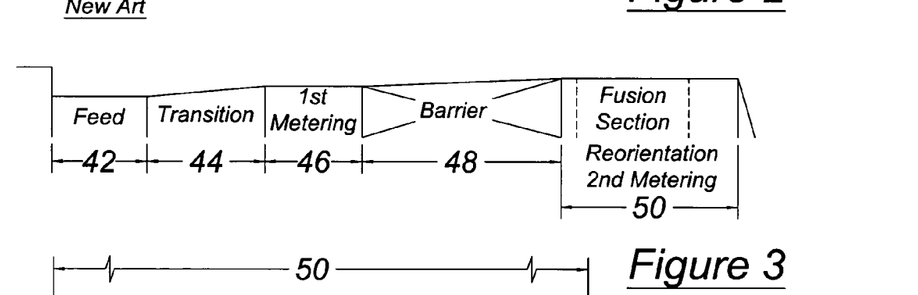
FIG. 3 is a schematic sketch showing the arrangement of sections of a plasticating screw according to this invention for plasticating resin, especially polypropylene.

FIG. 3 illustrates the arrangement of screw sections for processing polypropylene resin according to the present invention. A relative short, deep-root feed section 42 has an axial length of about seven screw diameters, with the length of one screw diameter being equal to one outside diameter of the main flight 24. Solid resin enters the barrel at the feed section 42 where it is heated and conveyed forward. The start of the heating elements 20 are preferably located about three to four screw diameters from the inlet port 14. The feed section 42 is followed by a transition section 44, whose length is about six screw diameters and in which the diameter of the core 26 gradually increases and the root depth becomes shallower with increasing distance along the screw axis. A first metering section 46, having a length of about five screw diameters and located immediately after the transition section 44, has a constant depth root where the majority of the resin is in a molten state. The core diameter in the first metering section 46 is maintained substantially at the same diameter as the core diameter at the end of the transition section 44. The root depth of metering section 46 is relatively shallow compared to that of the feed section 42. A barrier section 48 for separating resin solids from the resin melt includes a first channel containing solid resin and a second channel containing melted resin. The solids channel is relatively deep at the beginning of the barrier section and gradually becomes shallower along the length of the barrier section and as the volume of solids decreases. The melt channel gradually becomes deeper along the length of the barrier section to accommodate the increasing volume of the melt. The length of the barrier section is about eight screw diameters. Following the barrier section 48, is a reorientation and second metering section 50, where resin melt is separated from the solids and forced to flow over a secondary flight in order to enhance mixing and to achieve a uniform, homogeneous product at outlet port 18. The length of the reorientation and second metering section 50 is about 6.3 screw diameters. In the mixing section 50 other types of mixing mechanisms, such as distributive, dispersive or elongational mixing mechanisms, may be used.

Figure 4:
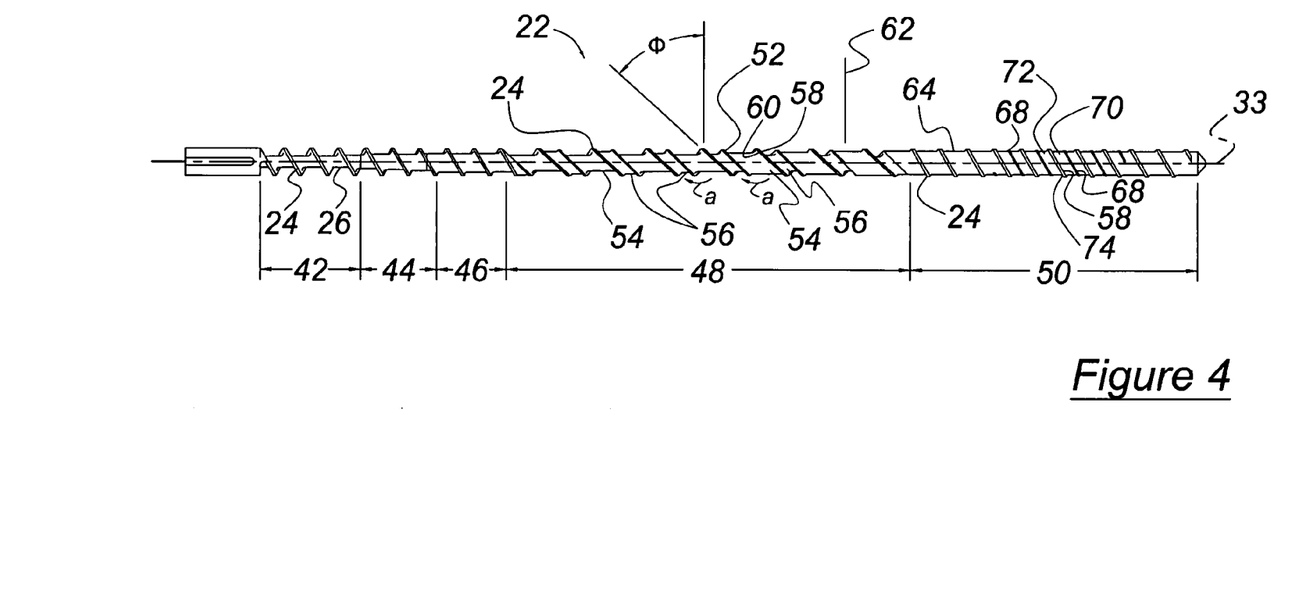
FIG. 4 is a side elevation view showing the screw illustrated in FIG. 1.

Referring next to FIG. 4, the feed section 42 of the screw 22 includes the helical main flight 24 having a constant, relatively deep core or root depth 26. Flight 24 continues into the transition section 44, where the diameter of the core 26 increases steadily along the screw axis, thereby causing the depth of the root to decrease as axial distance along the screw increases from the inlet port 14. In the metering section 46, the diameter of the core 26 remains constant at the largest core diameter of the transition section 44, and the depth of the root remains constant.

Extending along the barrier section 48 is a barrier flight 52, which is generated downstream of main flight 24 by machining its helix angle Ø at a greater angle than that of main flight 24 in sections 42, 44, 46 and 50, such as that disclosed in U.S. Pat. No. 3,650,652, which is assigned to the New Castle Industries, Inc, the Assignee of this invention. The main flight 24 runs parallel to the barrier flight 52 throughout the barrier section 48. The barrier section 48 is divided into a relatively wide solids channel 54 and a relatively narrow melt channel 56. As can be seen in FIG. 4, barrier flight 52 is undercut, or has a smaller diameter than that of the main flight 24. The barrier flight 52 has a radius, which is about 0.036 to 0.044 inches less than the radius of the main flight 24. Thus, as plasticated material is conveyed downstream along screw 22 through barrier section 48, a thin layer of melt material forms at the outer periphery of the solids channel 54. This melt material flows over the undercut barrier flight 52 and into melt channel 56 so that further solids can be melted by heat from the external sources 10 and heat generated by working the solids between the outer periphery of solids channel 54 and the interior wall 12 of the barrel 10. The solids channel 54 decreases in depth along barrier section 48 as the volume of solid material decreases, whereas the melt channel 56 increases in depth to accommodate the increasing volume of melt material. It is desirable to maintain the width of the solids channel 54 constant throughout the barrier section 48 in order to avoid disturbing the solids bed.

As further shown in FIG. 4, main flight 24 includes a push side 58 and a trailing side 60. Traversing downstream along barrier section 48, the solids channel 54 is positioned on the trailing side 60 of main flight 24 and the melt channel 56 is positioned on the push side 58 of main flight 24.

Near the axial end 62 of barrier melting section 48, however, the barrier flight discontinues. Near the termination of the barrier flight 52, the melt channel 56 begins to merge with the solids channel 54 to form a substantially uniform reorientation channel 64 in the reorientation and second metering section 50. The merger of the solids channel 54 and the melt channel 56 ends, and the reorientation channel 64 begins at a location substantially coinciding with a decreased pitch of the main flight 24. This forces solid plastic material conveyed along the reorientation section 50 toward the push side 58 of the main flight 24. The merger of the solids channel 54 with the melt channel 56 is complete within about one turn, i.e., 360° about the longitudinal axis 33 of the screw 22.

The depth of the reorientation channel 64 is preferably constant throughout the reorientation and metering section 50, although it may decrease from start to end by ten percent without significantly affecting the performance of the equipment. The helix angle of the main flight 24 and secondary flight 68 in section 50 is decreased compared to that in barrier section 48.

Figure 5:
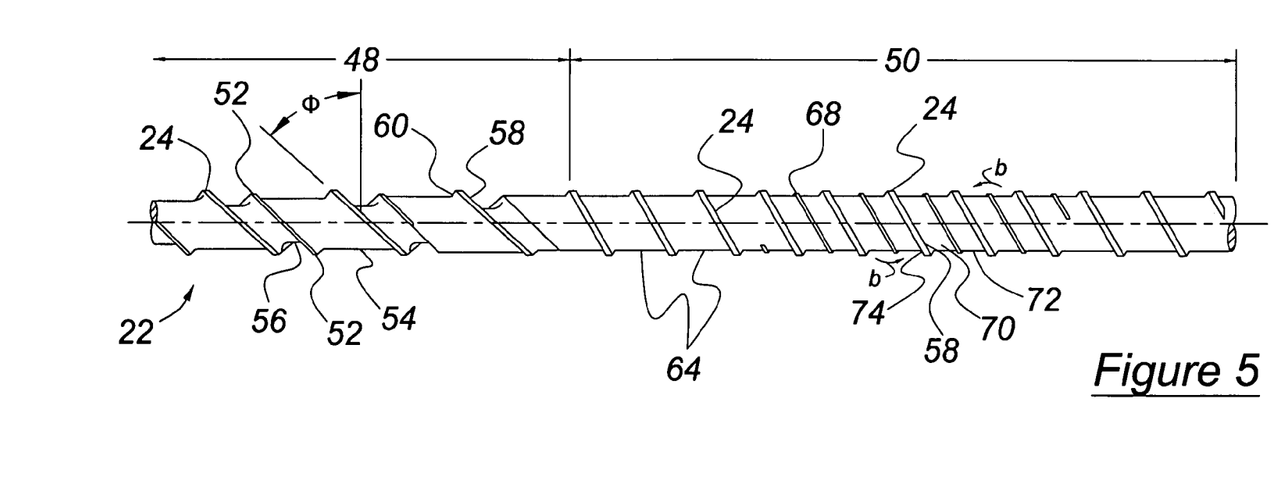
FIG. 5 is an enlarged side elevation view showing portions of the screw located near the end of the barrier section and the beginning of the reorientation and second metering section.
Figure 6:
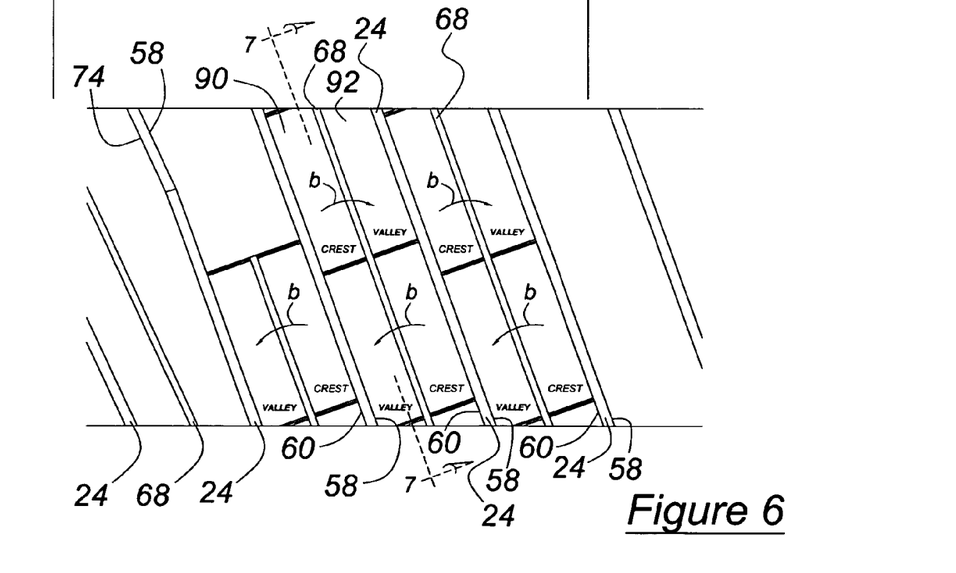
FIG. 6 is a top view of a portion of the length of the reorientation and second metering section of FIG. 5 shown in planform without curvature, illustrating the termination of the barrier flight, merger of the solids and melt channels, decreased pitch of the main flight, and start of the secondary flight.

As shown in FIGS. 4–6, the main helical flight 24 continues through section 50 with a decreased pitch beginning adjacent the axial end of the barrier section 48. A secondary flight 68 emerges in the reorientation and metering section 50, between adjacent passes of the main flight 24, thereby forming a new solids channel 70 located on the push side 58 of the main flight 24, and a new melt channel 72 located on the trailing side 60 of main flight 24. The secondary flight 68 has a radius, which is about 0.09 to 0.10 inches less than the radius of the main flight 24. The helix angle of the main flight 24 and secondary flight 68 in section 50 is decreased compared to that of the barrier section 48.

The operation of the screw 22 in accordance with the present invention can be explained with reference to the figures. With reference to FIG. 1, plastic material in the form of pellets or dry powder is fed into hopper 16, which communicates with channel 32. The feed section 42 conveys the plastic material forward as screw 22 rotates. The plastic material is heated and worked as it is conveyed along feed section 42 by main flight 24. Heat applied to the barrel 10 and the steadily increasing shear forces applied to the resin in the transition section where the root depth decreases as the resin is conveyed along the axis 33 cause the solid plastic material to melt. Melting occurs primarily at the outer periphery of the channel 32 or at the barrel wall in an area adjacent the inner wall 12 of the screw barrel 10, where a thin layer of melt material forms. The core diameter is maintained constant to produce a relatively shallow root depth in the metering section 46. There additional heat energy is generated by continual shearing the resin particles as they enter the space between the inner surface of the barrel and the outer periphery of the screw as the resin is conveyed forward.

In barrier section 48, the thin melt film crosses over the undercut barrier flight 52 and into the newly formed melt channel 56, as shown by arrows 'a' in FIG. 4. Solids resin continues to melt and is transferred from solid channel 54 to melt channel 56 along barrier section 48. Toward the end of barrier section 48, solid resin in channel 54 is preferably located adjacent the trailing side 60 of the main flight 24, and melted resin in channel 56 is preferably located adjacent the push side 58 of the main flight 24. However, solids are potentially more quickly transformed to melt by placing them on the push side 58 of the main flight 24 due to the increased pressure and shear force provided by the main flight 24.

Accordingly, in the reorientation and beginning of the second metering section 50 of the present invention a primary portion of the remaining solids move to the push side of main flight 24, which continues into and through section 50.

Thus, as shown in FIG. 6, most of the unmelted solid resin is placed on the high pressure, high shear push side 58 of the main flight 24, and melting of the solids is thereby enhanced. At the same time, melted material is separated by and forced to flow over secondary flight 68 in the second metering section 50, as shown by arrows 'b' in FIGS. 5 and 6 in order to enhance mixing and to achieve a more uniform temperature, viscosity, color and composition at the end of the metering section.

Figure 7:
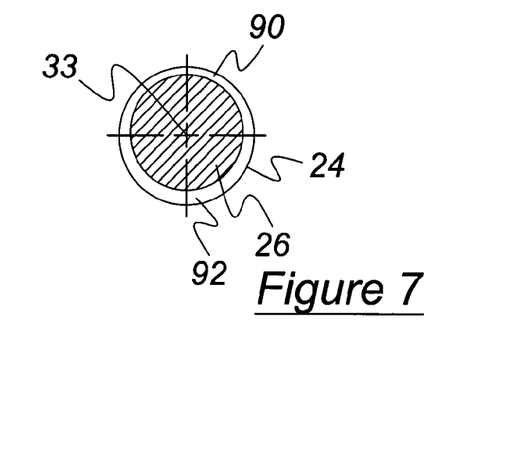
FIG. 7 is a cross section taken at plane 7—7 of FIG. 6.

FIGS. 6 and 7 shows the crests 90 from which solid resin flows toward the valleys 92 in the reorientation and second metering section 50.

Figure 8:
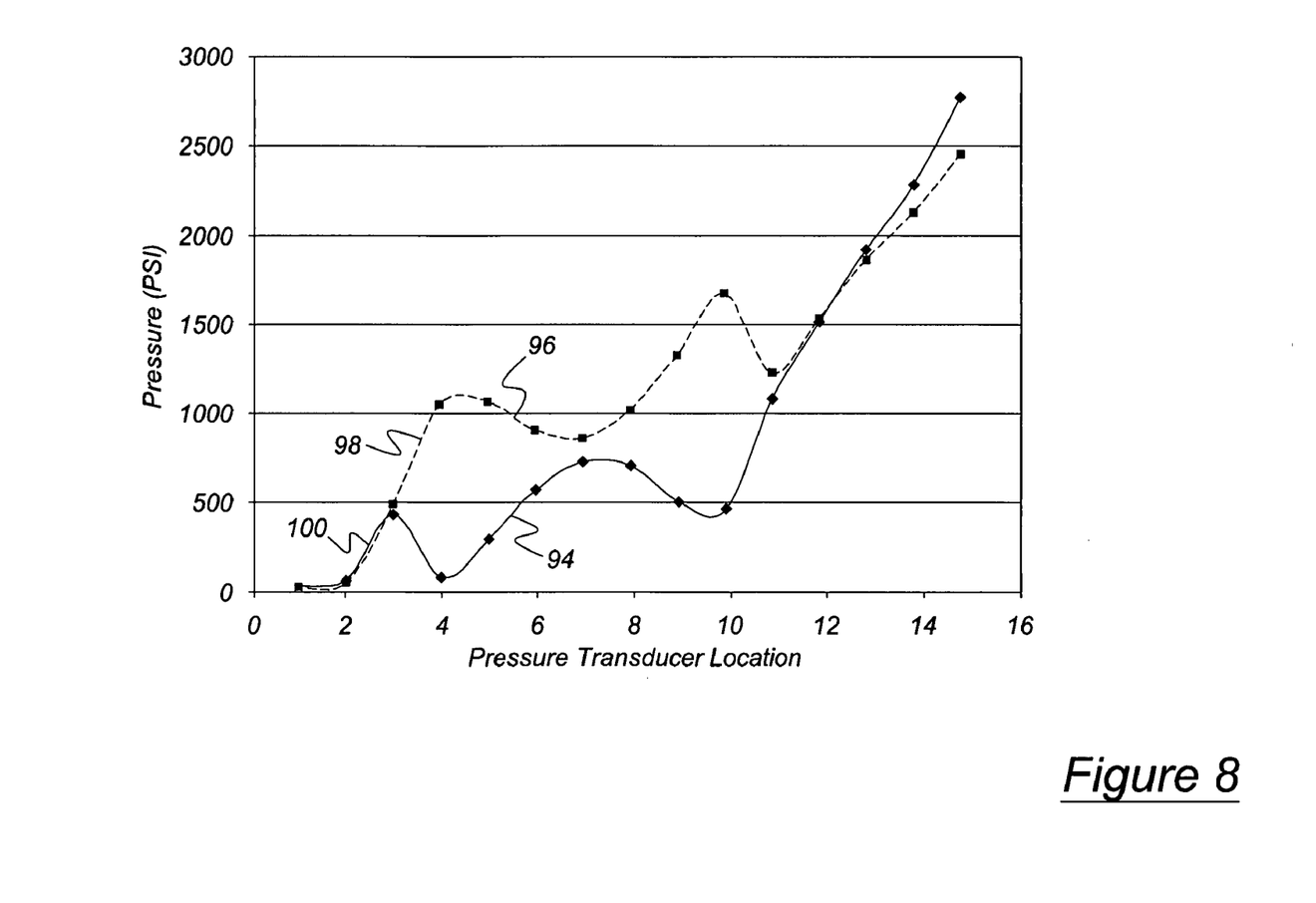
FIG. 8 is a graph showing the pressure in an extrusion or injection molding barrel when plasticating polypropylene with conventional apparatus and with the apparatus of this invention.

It has been determined that pressure within the plasticating barrel 10 along the screw length is a good measure of the melting rate, and the rate at which the resin melt is pumped through the barrel by the rotating screw. FIG. 8 illustrates the variation of pressure in a plasticating barrel as recorded by pressure transducers located along the barrel length. Graph 94 shows pressure data within the barrel when processing polypropylene resin using conventional plasticating apparatus. Graph 96 shows pressure data recorded while processing polypropylene resin using a plasticating screw having length sections arranged and formed according to the present invention. The desired early, rapid increase in pressure 98, which occurs in the feed section 42 and transition section 44 and is sustained downstream therefrom, demonstrates the improved output rate achieved with use of this invention. The increase in upstream barrel pressure 100 using conventional plasticating apparatus has a lower magnitude, dissipates promptly, and results in lower pressure throughout the upstream portions of the process when plasticating polypropylene.

It will thus be seen that a new and useful plasticating apparatus, method, and improved longitudinal portion have been illustrated and described. It will be apparent to those skilled in the art that various changes or modifications may be made to the invention without departing from the spirit thereof.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for plasticating polypropylene resin comprising:
   a barrel having an inlet through which resin enters the barrel, an outlet through which plasticated resin leaves the barrel, and an inner surface;
   a rotatable screw located within and cooperating with the inner surface of the barrel, having a longitudinal axis extending from the inlet toward the outlet, and including sections extending axially and arranged in a sequential series along the axis, the screw further including:
   a core extending along the axis;
   a main flight located on and projecting radially from the core, extending in a helix along the axis;
   a feed section;
   a transition section following the feed section;
   a first metering section following the transition section;
   a barrier melting section following the metering section; and
   a reorientation and second metering section following the barrier melting section, said reorientation and second metering section having a secondary flight and the main flight passing through the reorientation and second metering section having a pitch less than a pitch of the main flight in the barrier melting section.

2. The apparatus of claim 1, wherein the core includes a surface having a diameter, and the screw forms a root depth in an annular space between the core surface and a peripheral surface of the main flight, the diameter of the core surface and the root depth in the feed section being substantially constant along the axis.

3. The apparatus of claim 1, wherein the core includes a surface having a diameter, and the screw forms a root depth in an annular space between the core surface and a peripheral surface of the main flight, the diameter of the core surface increasing and the root depth decreasing along the transition section from the feed section to the metering section.

4. The apparatus of claim 1, wherein the core includes a surface having a diameter, and the screw forms a root depth in an annular space between the core surface and a peripheral surface of the main flight, the diameter of the core surface and the root depth in the metering section being substantially constant along the axis, and shallower than the root depth of the feed section.

5. The apparatus of claim 1, wherein the main flight includes a push side and a trailing side, and the barrier melting section further comprises:
   a barrier flight extending in a helix along the axis and located between successive helical passes of the main flight, the pitch of the main flight being substantially constant in the barrier melting section, the barrier flight and the main flight dividing the barrier melting section into a melt channel and a solids channel extending helically side-by-side, the barrier flight having a helical thread with a diameter less than a diameter of a helical thread of the main flight, so that melt material flows over the barrier flight and into the melt channel, whereby solid resin material conveyed along the barrier melting section is positioned adjacent the trailing side, and melt material conveyed along the barrier melting section is located adjacent the push side, the barrier flight terminating at an end of the barrier melting section.

6. The apparatus of claim 5, wherein:
   the melt channel and the solids channel in the barrier melting section merge into a substantially uniform channel in the reorientation and second metering section, thereby forcing solid plastic material conveyed along the reorientation and second metering section toward the push side of the main flight; and
   the secondary flight is disposed in the reorientation and second metering section between successive helical passes of the main flight, wherein solid material being conveyed is located adjacent the push side of the main flight and melt material being conveyed is located adjacent the trailing side of the main flight.

7. The apparatus of claim 6, wherein the main flight has a substantially constant diameter throughout the reorientation and second metering section, and the barrier flight has a substantially constant diameter throughout the barrier melting section.

8. The apparatus of claim 6, wherein the main flight has a thread width greater than a thread width of the secondary flight in the reorientation and second metering section.

9. The apparatus of claim 6, wherein the diameter of the barrier flight is substantially the same as a diameter of the secondary flight.

10. The apparatus of claim 9, wherein the barrier flight has a width substantially the same as a width of the secondary flight.

11. The apparatus of claim 10, wherein the reorientation and second metering section includes a multiple-channel metering section having a peak and a valley, and the resin flows across the secondary flight from the peak to the valley.

12. An apparatus for plasticating polypropylene resin comprising:
   a barrel having an inlet through which resin enters the barrel, an outlet through which plasticated resin leaves the barrel, and an inner surface;
   a rotatable screw located within and cooperating wit the inner surface of the barrel, having a longitudinal axis extending from the inlet toward the outlet, and including sections extending axially and arranged in a sequential series along the axis, the screw further including:

a core extending along the axis and including a surface having a diameter bounding a root depth in an annular space between the core surface and a peripheral surface of a main flight, the main flight being located on and projecting radially from the core, extending in a helix along the axis and including a push side and a trailing side;

a feed section wherein the diameter of the core surface and the root depth in the feed section are substantially constant;

a transition section following the feed section, wherein the diameter of the core surface increases, and the root depth decreases along the transition section;

a metering section following the transition section, wherein the diameter of the core surface and the root depth are substantially constant;

a barrier melting section following the metering section, the barrier melting section further comprises a barrier flight extending in a helix along the axis and located between successive helical passes of the main flight, the main flight having a constant pitch in the barrier melting section, the barrier flight and the main flight dividing the barrier melting section into a melt channel and a solids channel extending helically side-by-side, the barrier flight having a helical thread with a diameter less than a diameter of a helical thread of the main flight, so that melt material flows over the barrier flight and into the melt channel, whereby solid resin material conveyed along the barrier melting section is positioned adjacent the trailing side and melt material conveyed along the barrier melting section is located adjacent the push side, the barrier flight terminating at an end of the barrier melting section; and a reorientation and second metering section following the barrier melt section, including a secondary flight to form a multiple-channel portion, the multiple-channel portion having a plurality of adjacently spaced crest and valley pairs so that resin repeatedly passes forward and back across the secondary flight from the plurality of crests to the corresponding paired valley while being conveyed therethrough, and wherein;

the reorientation and second metering section into which the main helical flight passes has a pitch less than a pitch of the main flight in the barrier melting section, the melt channel and the solids channel in the barrier melting section merging into a substantially uniform channel in the reorientation and second metering section, thereby forcing solid plastic material conveyed along the reorientation and second metering section toward the push side of the main flight, and the secondary flight is disposed in the reorientation and second metering section between successive helical passes of the main flight, wherein solid material being conveyed is located adjacent the push side of the main flight and melt material being conveyed is located adjacent the trailing side of the main flight.

13. The apparatus of claim 12, wherein the main flight has a substantially constant diameter throughout the reorientation and second metering section, and the barrier flight has a substantially constant diameter throughout the barrier melting section.

14. The apparatus of claim 12, wherein the main flight has a flight width greater than a flight width of the secondary flight in the reorientation and second metering section.

15. The apparatus of claim 12, wherein the diameter of the barrier flight is substantially the same as a diameter of the secondary flight.

16. The apparatus of claim 15, wherein the barrier flight has a width substantially the same as a width of the secondary flight.

* * * * *